US008762599B2

(12) United States Patent
Espig et al.

(10) Patent No.: US 8,762,599 B2
(45) Date of Patent: Jun. 24, 2014

(54) DELEGATING A POLL OPERATION TO ANOTHER DEVICE

(71) Applicant: Intel Corporation, Santa Clara, CA (US)

(72) Inventors: Michael J. Espig, Newberg, OR (US); Zhen Fang, Portland, OR (US); Ravishankar Iyer, Hillsboro, OR (US); David J. Harriman, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/729,172

(22) Filed: Dec. 28, 2012

(65) Prior Publication Data

US 2013/0138843 A1 May 30, 2013

Related U.S. Application Data

(63) Continuation of application No. 12/482,614, filed on Jun. 11, 2009, now Pat. No. 8,364,862.

(51) Int. Cl.
*G06F 3/00* (2006.01)

(52) U.S. Cl.
USPC .................... 710/46; 710/36; 710/44; 710/45

(58) Field of Classification Search
None
See application file for complete search history.

(56) References Cited

U.S. PATENT DOCUMENTS

| 4,598,363 | A | * | 7/1986 | Clark et al. | 710/46 |
|---|---|---|---|---|---|
| 5,504,921 | A | * | 4/1996 | Dev et al. | 709/223 |
| 5,586,297 | A | | 12/1996 | Bryg et al. | |
| 5,615,323 | A | * | 3/1997 | Engel et al. | 345/440 |
| 5,819,028 | A | * | 10/1998 | Manghirmalani et al. | 714/57 |
| 5,862,338 | A | * | 1/1999 | Walker et al. | 709/224 |
| 5,903,749 | A | * | 5/1999 | Kenner et al. | 712/226 |
| 6,009,488 | A | * | 12/1999 | Kavipurapu | 710/105 |
| 6,138,171 | A | * | 10/2000 | Walker | 719/318 |
| 6,148,337 | A | * | 11/2000 | Estberg et al. | 709/224 |
| 6,477,667 | B1 | * | 11/2002 | Levi et al. | 714/57 |
| 6,504,785 | B1 | * | 1/2003 | Rao | 365/230.05 |
| 6,704,842 | B1 | | 3/2004 | Janakiraman et al. | |

(Continued)

FOREIGN PATENT DOCUMENTS

| KR | 10-2006-0112184 | 10/2006 |
| KR | 10-2006-0126065 | 12/2006 |

OTHER PUBLICATIONS

"Intel® 64 and IA-32 Architectures Software Developer's Manual" vol. 3A: System Programming Guide, Part 1; 253668-025US Intel Corporation, Nov. 2007.*

(Continued)

*Primary Examiner* — Henry Tsai
*Assistant Examiner* — Jing-Yih Shyu
(74) *Attorney, Agent, or Firm* — Trop, Pruner & Hu, P.C.

(57) ABSTRACT

In one embodiment, the present invention includes a method for handling a registration message received from a host processor, where the registration message delegates a poll operation with respect to a device from the host processor to another component. Information from the message may be stored in a poll table, and the component may send a read request to poll the device and report a result of the poll to the host processor based on a state of the device. Other embodiments are described and claimed.

16 Claims, 3 Drawing Sheets

(56) References Cited

U.S. PATENT DOCUMENTS

| | | | |
|---|---|---|---|
| 6,892,312 B1* | 5/2005 | Johnson | 713/320 |
| 7,069,480 B1* | 6/2006 | Lovy et al. | 714/57 |
| 7,298,758 B2* | 11/2007 | Robertson | 370/449 |
| 7,509,540 B1* | 3/2009 | Lovy et al. | 714/57 |
| 7,516,247 B2* | 4/2009 | Hummel et al. | 710/15 |
| 7,523,197 B2* | 4/2009 | Castaneda et al. | 709/224 |
| 7,610,569 B2* | 10/2009 | Park | 716/106 |
| 7,640,384 B2* | 12/2009 | Hammarlund et al. | 710/200 |
| 7,774,522 B2* | 8/2010 | Bouvier | 710/55 |
| 7,797,563 B1* | 9/2010 | Moll et al. | 713/324 |
| 7,805,550 B2* | 9/2010 | Kimelman et al. | 710/46 |
| 7,917,729 B2* | 3/2011 | Georgiou et al. | 712/32 |
| 8,009,584 B1* | 8/2011 | Viswanath et al. | 370/254 |
| 8,024,499 B1* | 9/2011 | Aybay et al. | 710/46 |
| 8,180,934 B2* | 5/2012 | Nomura | 710/19 |
| 8,209,559 B2* | 6/2012 | Memon et al. | 713/320 |
| 8,301,870 B2* | 10/2012 | Kailas | 712/227 |
| 2004/0024871 A1* | 2/2004 | Kitchin | 709/225 |
| 2004/0078528 A1 | 4/2004 | Chauvel et al. | |
| 2005/0223178 A1* | 10/2005 | Garcia et al. | 711/150 |
| 2006/0053326 A1* | 3/2006 | Naveh et al. | 713/323 |
| 2006/0101226 A1 | 5/2006 | Benhase et al. | |
| 2006/0168396 A1* | 7/2006 | LaMothe et al. | 711/113 |
| 2006/0277594 A1 | 12/2006 | Chiavegatto, Jr. et al. | |
| 2007/0150671 A1* | 6/2007 | Kurland | 711/154 |
| 2007/0294486 A1 | 12/2007 | Goodman et al. | |
| 2008/0130543 A1* | 6/2008 | Singh et al. | 370/311 |
| 2008/0209133 A1 | 8/2008 | Ozer et al. | |
| 2009/0019232 A1 | 1/2009 | Deshpande et al. | |
| 2010/0191920 A1* | 7/2010 | Fang et al. | 711/146 |
| 2010/0191921 A1 | 7/2010 | Cantin | |

OTHER PUBLICATIONS

Korean Patent Office, Combined Search and Written Opinion for PCT Application No. PCT/US2010/027003, dated Sep. 30, 2010, 9 pgs.

U.S. Appl. No. 12/360,533, filed Jan. 27, 2009, entitled, "Providing Address Range Coherency Capability to a Device," by Zhen Fang, et al.

Mike Parker, "A Case for User-Level Interrupts," School of Computing, University of Utah, Feb. 22, 2000, pp. 1-2.

Intel, "Prescott New Instructions Software Developer's Guide," Jun. 2003, pp. 1-76.

* cited by examiner

DELEGATING A POLL OPERATION TO ANOTHER DEVICE

This application is a continuation of U.S. patent application Ser. No. 12/482,614, filed Jun. 11, 2009, the content of which is hereby incorporated by reference.

BACKGROUND

Modern computer systems typically include a processor and various other components that are coupled together. In addition, many systems include one or more peripheral or input/output (IO) devices.

To enable communications between software that executes on the processor and operations that may be performed by the other devices, different mechanisms can be used. Common mechanisms include a polling method and an interrupt method. However, neither of these methods is optimal. Using a polling technique, software either continuously polls status registers on the IO device if the IO device's task is fine-grained, or relies on an asynchronous interrupt through the operating system (OS) if the IO device's task is coarse-grained. While a polling method may ensure good performance, it suffers from drawbacks. First, the core/thread that needs to know the completion status has to continuously check (e.g., via a busy spin operation) on a memory mapped input/output (MMIO) status register, preventing itself from entering a low power state. Second, repetitive polling on an uncacheable MMIO address results in a large amount of traffic on a system interconnect. In a word, the fast response time comes at a cost of power consumption (a major issue especially for ultra-low power environments) and waste of system resources.

An interrupt method avoids busy spinning of a processor on the status register. While waiting, the core/thread can either context switch to execute another process or enter a lower power state. Completion of the task on the IO device triggers an interrupt into the OS. However, in a typical system, several hundred cache misses and tens of thousand clock cycles are induced by a kernel interrupt handler. This performance overhead of interrupt handling is not acceptable for many fine-grained logic blocks.

Thus both polling and interrupt techniques are not satisfactory for a low power application, as polling negates a large portion of any power benefits from using an IO device, while interrupts introduce a large performance penalty.

DETAILED DESCRIPTION

In various embodiments, a poll delegation technique may be implemented in which an interconnect serves as a delegate in a polling and notification process. In one embodiment the interconnect may be an input/output (IO) interconnect, although the scope of the present invention is not limited in this regard. Using this technique, the interconnect polls IO devices for a host processor such as a central processing unit (CPU) and notifies an application software of a given event using one of a number of techniques such as a test and hold operation, or by update to a user-selected memory location that triggers a processor's exit from a power optimized state. In one embodiment, user-level instructions such as MONITOR/MWAIT may be used to notify application software. In various embodiments, poll delegation may enable a response time as short as polling, and power consumption/resource usage as low as an interrupt-based technique, thus providing user-level notification of IO device status without the need for polling or interrupts.

In one embodiment the IO interconnect may include specific-purpose hardware to poll status register(s) of an IO device. Then upon a status change, the IO interconnect can issue a write operation (e.g., a coherent write) to the memory address that is being monitored by the host. The coherent write will be detected by this hardware, and cause the thread that is waiting on the address to resume execution. Thus in various embodiments, a processor can stay in a low power state until the IO device is done with its task, and resume execution almost as fast as if it had been busy-spinning. No change is required in the processor core, the cache, the system coherent interconnect, or the IO devices.

The MONITOR/MWAIT pair of instructions can support inter-thread synchronization. The instruction pair can be available at all privilege levels. MONITOR can be used to enable a CPU to set up monitoring hardware of the CPU to detect stores to an effective address range (typically a cacheline). This address range belongs to a coherent, write-back address range. In one embodiment, cache coherency hardware may monitor for a write to the destination address. When that write occurs the cache coherency controller will send a message to the processor to come out of the low power state. After this set up, the succeeding MWAIT instruction puts the processor core into a selected low-power state (e.g., a clock-gated state or a power-gated state). When the monitoring hardware detects a store to any byte in the address range, the stalled thread resumes execution from the instruction following MWAIT. Architecturally, MWAIT behaves like a no operation (NOP). While these MONITOR and MWAIT instructions are designed to implement performance and power-optimized inter-thread synchronization, embodiments can leverage the instructions for IO device completion notification.

Figure 1:
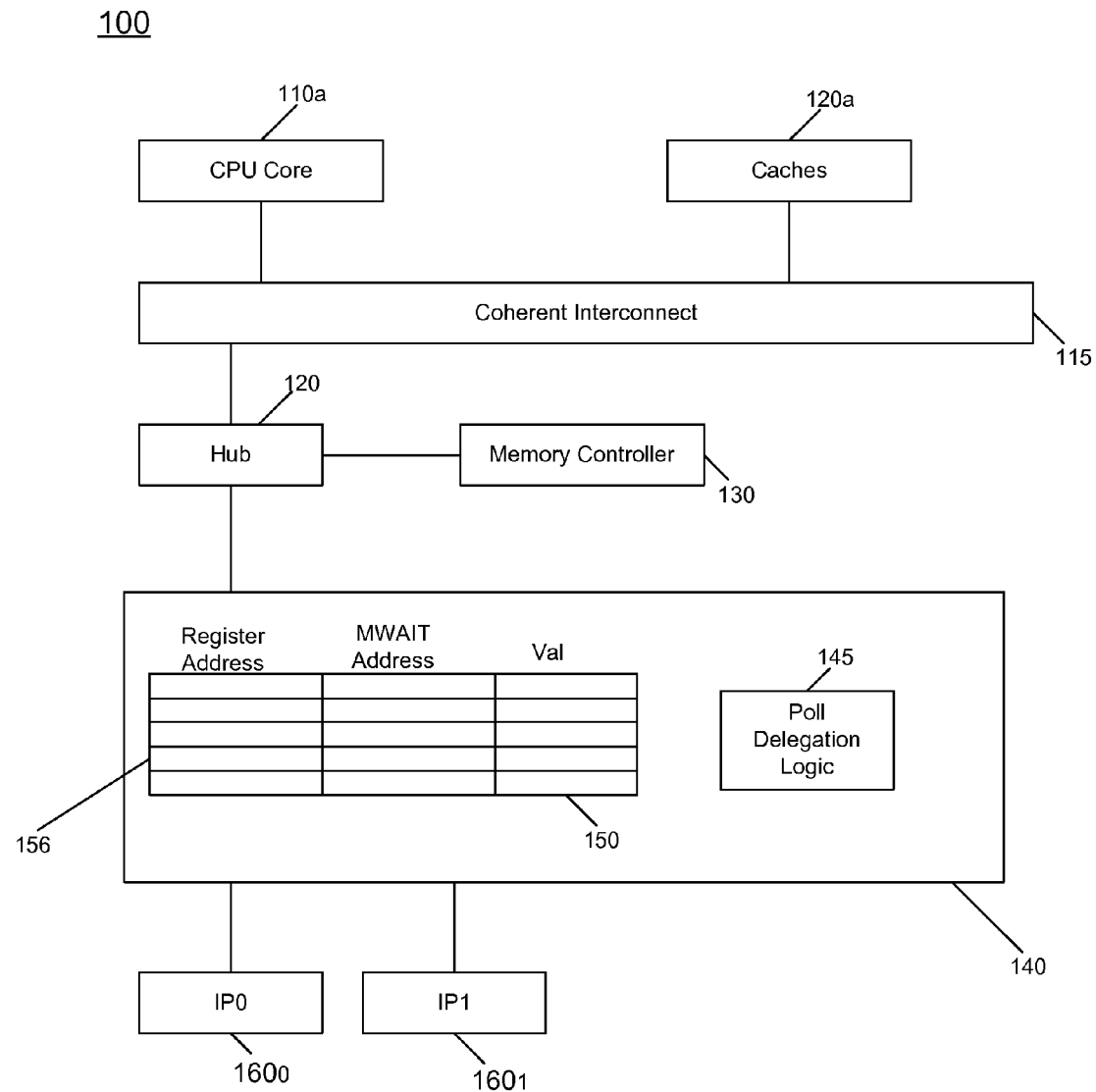
FIG. 1 is a block diagram of a system in accordance with one embodiment of the present invention.

Referring now to FIG. 1, shown is a block diagram of a system in accordance with one embodiment of the present invention. As shown in FIG. 1, system 100 may be a system on a chip (SoC) that includes various components interconnected together and which may provide mechanisms to handle polling delegation in accordance with an embodiment of the present invention. Specifically, in the embodiment of FIG. 1, SoC 100 may include a plurality of processor cores only one of which, core $110_a$, is shown for ease of illustration.

The one or more cores may be coupled via a coherent interconnect 115 to one or more cache memory $120_a$. Coherent interconnect 115 may include various hardware, software and/or firmware to implement a cache coherency protocol, such as a modified exclusive shared invalid (MESI) protocol, to maintain a coherent view of information stored within the system. In some implementations, coherent interconnect 115 may be a layered protocol including various layers such as a protocol layer, a link layer and possibly a physical layer (where the system is not on a single die).

In turn, coherent interconnect 115 may be coupled via a hub 120 to a memory controller 130 that in turn may be coupled to a system memory, e.g., dynamic random access memory (DRAM), for example. Note that such memory is not shown in FIG. 1, as the memory may be external to the SoC.

In addition, coherent interconnect 115 may be coupled to an upstream side of an IO interconnect 140 which may be of a given communication protocol such as a Peripheral Component Interconnect Express (PCI Express™ (PCIe™)) protocol in accordance with links based on the PCI Express™ Specification Base Specification version 2.0 (published Jan. 17, 2007) (hereafter the PCIe™ Specification), or another such protocol. IO interconnect 140 may include a polling table 150 in accordance with an embodiment of the present invention. While shown as being present in the interconnect, other implementations may locate this buffer elsewhere in close relation to the interconnect. In turn, various devices, e.g., devices $160_0$ and $160_1$, which may be IO devices, intellectual property (IP) blocks or so forth may be coupled to a downstream side of IO interconnect 140.

As seen in FIG. 1, polling table 150 stores a plurality of entries including, e.g., entry 156. Each entry may include a device monitored location such as an address of a status register present in one of devices 160, a memory monitored address, which may correspond to a physical address in system memory that corresponds to a monitored location for an MWAIT instruction, and a initial value, which may be the initial value of the device monitored location, e.g., the initial value of the status register. Embodiments thus essentially associate each status register on an IO device with a corresponding memory address that is being monitored by the CPU. While shown with this particular implementation in the embodiment of FIG. 1, the scope of the present invention is not limited in this regard.

Figure 2:
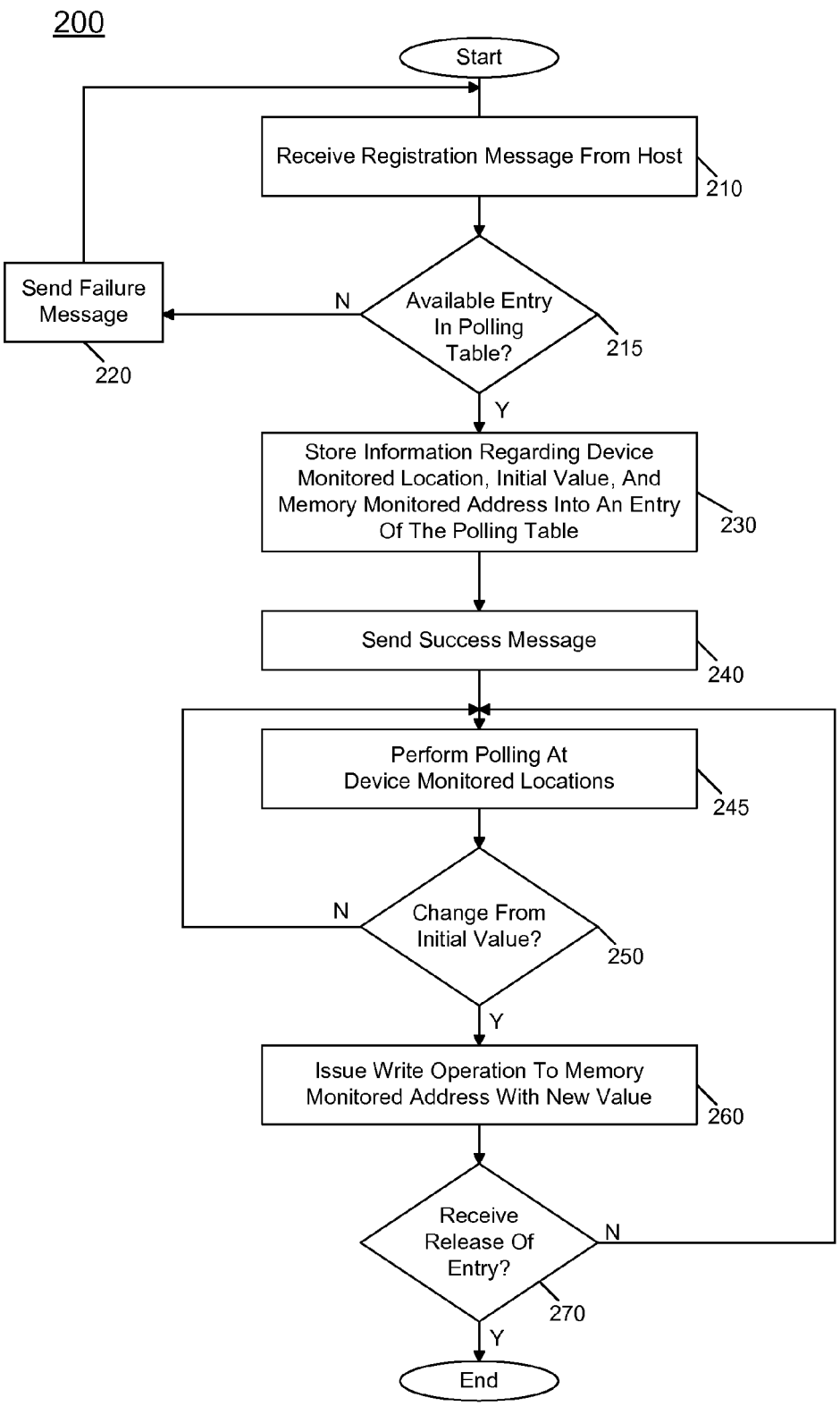
FIG. 2 is a flow diagram of a method in accordance with one embodiment of the present invention.

Referring now to FIG. 2, shown is a flow diagram of a method in accordance with one embodiment of the present invention. Specifically, FIG. 2 shows a flow diagram that may be performed by logic of an IO or other interconnect that handles poll delegation on behalf of a host processor. In some implementations, method 200 may be implemented by way of a state machine or other logic of an interconnect, although other implementations are possible. As shown in FIG. 2, method 200 may begin by receiving a registration message from an application (block 210). In one embodiment, the registration message may include a tuple of MMIO address, true physical memory address, and initial value. In one embodiment, this registration message may include a physical address range for a location and a monitored system memory that backs up a monitored virtual address range, a MMIO address for obtaining the status of a location in a device to be monitored, e.g., a status register, and an initial value of such register, which may also correspond to the initial value stored in the monitored address of system memory. In one embodiment, an application may make a system called to pass this information to the interconnect, e.g., using a host processor.

Still referring to FIG. 2, it may be determined whether an entry is available in the polling table of the interconnect (diamond 215). If not, a failure message may be sent back to the host (block 220). Otherwise, the information may be stored into an entry of the polling table (block 230). This information thus may correspond to a device monitored location (i.e., corresponding to a MMIO address of a completion status register of the device), an initial value of the register, and a memory monitored address (which may be a physical address location within the system memory that is monitored, e.g., by a MONITOR/MWAIT instruction pair). Accordingly, a success message may be sent from the interconnect to the host processor (block 240).

During operation, the application then initializes the monitored location, issuing the MONITOR and MWAIT instructions, thus enabling the device to begin executing its task. Various such tasks may be realized, including offloading of specialized functions, graphics processing, physics processing or so forth. As one example, the function may be a specialized calculation such as a fast fourier transform (FFT). The application thus may pass various information regarding the FFT such as the number of points, the starting address and so forth, prior to execution of the MONITOR/MWAIT instructions.

Accordingly, at this time one or more cores of the host processor may enter a low power state, which may be configurable depending on a type of operation that the device is to perform.

Referring still to FIG. 2, after the device begins executing its operation, the interconnect may perform polling at the device monitored locations (block 245). In one embodiment, the polling operation may issue a read operation to each register address in the polling table, and compare the fetched value against the initial value in the polling table entry, as discussed with regard to diamond 250. In an embodiment, the poll delegation logic is to issue a read request to at least one device at a predetermined interval to perform the poll. Understand that such polling may poll a number of locations present in one or more devices, namely whatever addresses are indicated in a polling table. It may be determined on each polling operation whether there is a change in any entries' value from its initial value (diamond 250). If not, a further polling iteration may occur. If a change occurs, control instead passes to block 260, where a write operation may be issued to the memory monitored address with the new value. In one embodiment, the interconnect may issue a coherent write to this address, which may be realized using a message signaling interrupt (MSI), in one embodiment. This coherent write to the monitored address in memory will cause the processor core to wake up from the low power state, enabling the halted thread to proceed. With reference to FIG. 2, it may be determined after issuing the write operation whether a release of the entry has been received (diamond 270). In one embodiment, such a release may be received from the OS when a given application associated with the poll delegation entry terminates. Accordingly, if the device knows the task is done, the device could issue an eviction request to the IO interconnect. Control passes from diamond 270, if the release is not indicated, back to block 245, where further polling may be performed. While shown with this particular implementation in the embodiment of FIG. 2, the scope of the present invention is not limited in this regard.

The generation of the registration message and release message may use help from the OS. The user-level MONITOR and MWAIT instructions may be performed completely in user mode, and the poll delegation operation can be purely hardware. Note that the registration and release are usually only performed at the application initialization and cleanup phases. Therefore their power and performance do not matter. In contrast, the user-level setup and poll detection usually are executed a large number of times. The efficiency of these two steps thus enables efficient system power and performance characteristics.

To support multiple IP accelerators, polling table 150 may be a multi-entry translation table. In one embodiment, each entry 156 contains an MMIO address and the physical memory address that is linked to it. In some implementations, the number of entries in the polling table can be a small number, e.g., N=8. In the extreme case when more than N registers need to be checked at the same time, the user thread can always directly poll the registers instead of using the above method, although a virtualized polling table could instead be used.

In one embodiment, a message signaling interrupt (MSI-X) feature of PCI that may be in IO interconnect 140 provides hardware that allows devices 160 to issue writes to system memory locations. In MSI-X, the target memory locations are special addresses that will lead to interrupts. In embodiments instead addresses in write back memory space can be used as targets of such writes. The property of the target memory location is transparent to MSI-X hardware, it simply delivers a packet from the IO interconnect 140 to the memory system. In some implementations the polling performed by IO interconnect 140 may cause a poll of registered status register addresses, even if the devices that some of the registers are not actively computing. This is because in some implementations the poll delegation logic 145 has no knowledge of whether or not a valid entry in its mapping table represents an inactive device. Different mechanisms can be used to provide this information to the logic. For example, a system call can be provided by the OS to allow an application to release a particular entry in the polling table. Alternatively, the IO interconnect 140 could intercept power-state transition commands that are sent to the IP blocks 160 so that it will know which status register will not be updated any time soon. This information may be included in a status portion of the entries of polling table 150 in such embodiments. It is noted however, that the cost for the IO interconnect 140 to poll IO registers is rather low, and as such the power and performance impact of indiscriminate polling may be minimal.

While described herein for a system-on-chip (SoC) configuration, which may be the primary processing component for a computing device such as an embedded, portable or mobile device, other implementations may be used in other systems such as multiprocessor computer systems having a processor coupled to a coherent interconnect, that in turn may be coupled to an IO interconnect via one or more chipsets or other components. Still further, embodiments may be implemented in a multi-chip architecture for a computing device.

Figure 3:
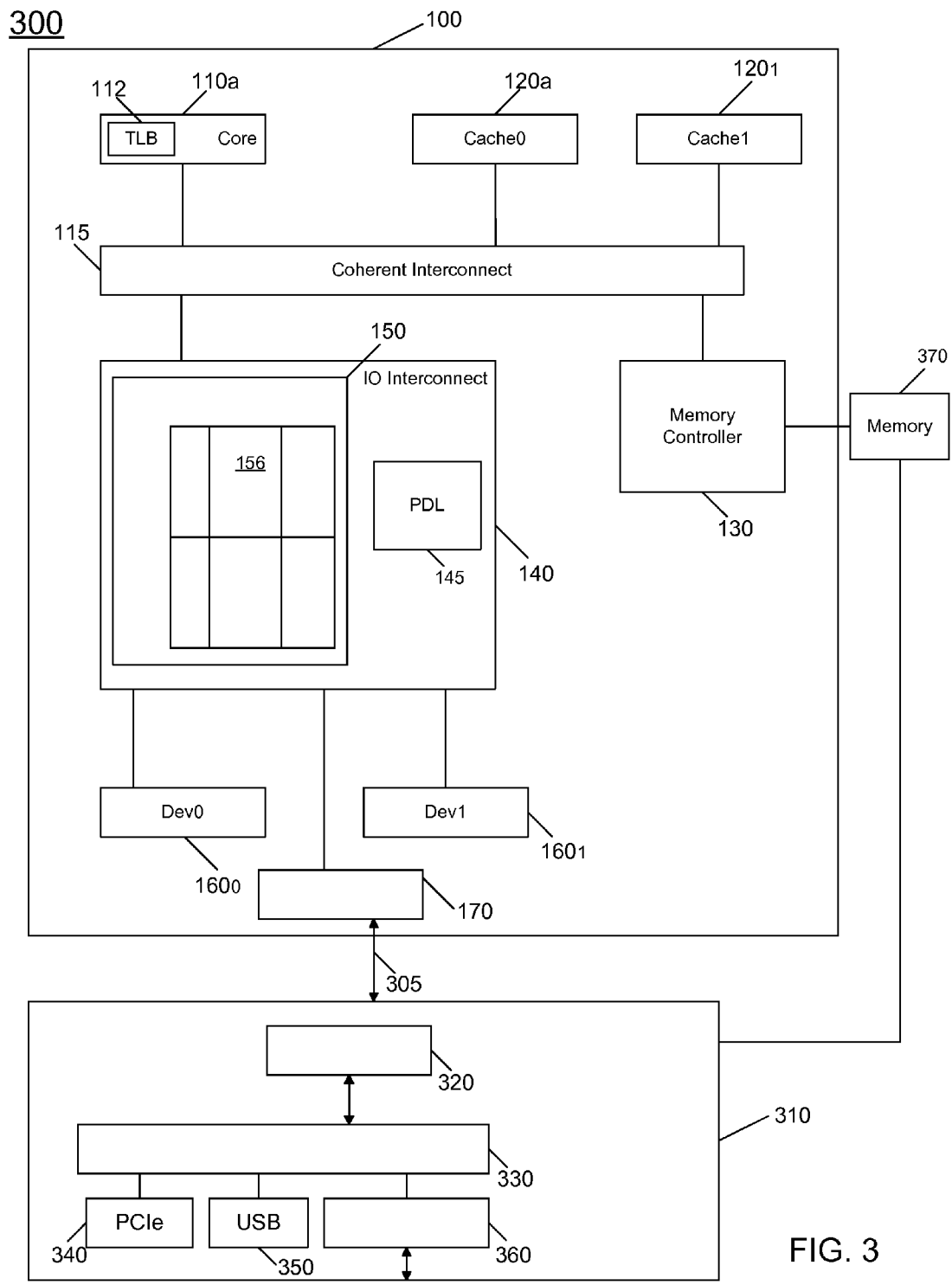
FIG. 3 is a block diagram of a system in accordance with another embodiment of the present invention.

Referring now to FIG. 3, shown is a block diagram of a system in accordance with another embodiment of the present invention. As shown in FIG. 3, system 300 may be multi-chip architecture, namely a system 300 including a first chip 100, which may be a first SoC, and which may be configured the same as that of FIG. 1, and where core 110*a* includes a translation lookaside buffer (TLB) 112 and an additional cache 120$_1$, a second integrated circuit 310, which may provide peripheral functionality, and a memory 370, which may be a DRAM coupled to one or more of the chips. As shown in FIG. 3, SoC 100 may communicate with IC 310 via an interconnect 305 that in turn is coupled to a first bridge 170 of SoC 100 and a second bridge 320 of IC 310. In turn, second bridge 320 may be coupled to an IO interconnect 330 that in turn can be coupled to one or more peripheral devices, e.g., a PCIe device 340 and a universal serial bus (USB) device 350. Still further, IO interconnect 330 may be coupled via a third bridge 360 to off-chip components via a serial over network interface (SONIC)/external fabric. In the embodiment of FIG. 3, note that both IO interconnect 140 and IO interconnect 330 may include polling tables and poll delegation logic 145 in accordance with an embodiment of the present invention. While shown with this particular implementation in the embodiment of FIG. 3, other implementations are of course possible.

Using an embodiment of the present invention, a process can avoid either suffering from long latency for interrupt handling, or have to busy-spin in a high power state. On a processor that supports MONITOR/MWAIT or similar test and set functions, poll delegation allows the processor to enter power and performance-optimized states while still achieving the quick response time of busy spins. For low-power SoCs that include fine-grained IP blocks, embodiments provide a near-optimal completion notification solution in terms of power and performance.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
a core to generate a registration message to delegate a poll operation to an input/output (IO) interconnect;
the IO interconnect coupled to the core, the IO interconnect to include a poll table having a plurality of entries each having a first address field to store a first address to be received in a registration message, a destination address field to store a destination address in a system memory to be received in the registration message, and an initial value field to store an initial value associated with the first address received in the registration message; and
at least one device coupled to the IO interconnect to perform an operation for an application to be executed on the core and to include at least one status register, the IO interconnect including a poll delegation logic to poll the at least one status register responsive to information in a poll table entry, and to issue a write transaction to the destination address if a polled value of the at least one status register differs from an initial value of the at least one status register stored in the poll table entry.

2. The apparatus of claim 1, wherein the poll delegation logic is to issue a read request to the at least one device at a predetermined interval to perform the poll.

3. The apparatus of claim 1, wherein the poll delegation logic is to perform a comparison between data received from the at least one device responsive to a read request and the initial value and to issue the write transaction when the data and the initial value differ.

4. The apparatus of claim 1, wherein the at least one device is to update the initial value to the polled value upon completion of the operation.

5. The apparatus of claim 1, wherein the apparatus comprises a system on a chip (SoC) formed on a single semiconductor die, and the at least one device comprises an intellectual property (IP) block.

6. The apparatus of claim 1, wherein the core is to send an eviction message to the IO interconnect to delete an entry in the poll table when an application corresponding to the entry is terminated.

7. The apparatus of claim 1, wherein the core is to execute a first instruction to set up the destination address and a second instruction to cause the core to enter a low power state until the destination address is updated.

8. The apparatus of claim 7, wherein the core is to send the registration message to the IO interconnect prior to execution of the first and second instructions.

9. A system comprising:
a system on a chip (SoC) including:
at least one core including a first logic to execute a first instruction to set up a monitored address in a memory, a second logic to cause the at least one core to enter a low power state when a predetermined instruction follows the first instruction, and a third logic to monitor for a write to the monitored address;
a first input/output (TO) interconnect to include a poll table to store a tuple including an identifier of a register in an intellectual property (IP) block coupled to the first IO interconnect, the monitored address in the memory, and an initial value associated with the register, and a delegation logic to receive a delegation message from the at least one core, and based on the tuple, obtain a current value of the register and responsive to a difference between the current value and the initial value, issue a coherent write operation to write data corresponding to the current value to the monitored address in the memory via a message signaling interrupt; and
the IP block coupled to the first IO interconnect to include the register and to perform a function for an application to execute on the at least one core; and
the memory coupled to the SoC via a memory interconnect, wherein the third logic is to cause the at least one core to exit the low power state responsive to the data being written to the monitored address.

10. The system of claim 9, wherein the at least one core is to continue execution of the application at a next instruction following the predetermined instruction after the exit from the low power state.

11. The system of claim 10, wherein the IP block is to update the initial value to the current value upon completion of the function.

12. The system of claim 10, wherein the at least one core is to send the delegation message to the first IO interconnect with the tuple prior to execution of the first instruction.

13. A method comprising:
receiving a registration message from a host processor in an interconnect coupled between the host processor and a device, the registration message to delegate a poll operation with respect to the device to the interconnect;
storing information regarding a device monitored location, a memory monitored address, and an initial value of the device monitored location in a poll table associated with the interconnect;
sending, via a poll delegation logic of the interconnect, a read request to the device to poll the device, comparing the initial value with a device value obtained from the device monitored location, and reporting a result of the poll to the host processor if the device value is different than the initial value;
issuing a write request from the interconnect to the memory monitored address in a system memory to report the result;
issuing a message signaling interrupt from the interconnect to the system memory to issue the write request; and
wherein the host processor is placed into a low power state after sending the registration message, and responsive to the write to the memory monitored address, the host processor is to exit the low power state.

14. The method of claim 13, wherein the poll table includes a plurality of entries each including a device monitored location, a memory monitored address, and an initial value, and further comprising sending a read request to the device for each of the plurality of entries.

15. The method of claim 13, wherein the device monitored location corresponds to a status register of the device, and associating the status register with the memory monitored address via the poll table.

16. The method of claim 13, further comprising initiating the registration message via an application, and performing a first function on the device for the application, wherein the application is to initiate the first function after the information is stored in the poll table, and to cause the host processor to enter into a low power state.

* * * * *